United States Patent
Citraro et al.

(10) Patent No.: US 10,991,125 B2
(45) Date of Patent: *Apr. 27, 2021

(54) DATA PROCESSING SYSTEMS FOR REAL-TIME CAMERA PARAMETER ESTIMATION

(71) Applicant: Second Spectrum, Inc., Los Angeles, CA (US)

(72) Inventors: Leonardo Citraro, S. Antonio (CH); Pablo Márquez Neila, Lausanne (CH); Stefano Savarè, Lausanne (CH); Vivek Jayaram, Los Gatos, CA (US); Charles Xavier Quentin Dubout, Écublens (CH); Felix Constant Marc Renaut, Morges (CH); Andres Michael Levering Hasfura, San Antonio, TX (US); Horesh Beny Ben Shitrit, Echichens (CH); Pascal Fua, Vaux sur Morges (CH)

(73) Assignee: Second Spectrum, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/798,900

(22) Filed: Feb. 24, 2020

(65) Prior Publication Data

US 2021/0027493 A1    Jan. 28, 2021

Related U.S. Application Data

(63) Continuation of application No. 16/521,761, filed on Jul. 25, 2019, now Pat. No. 10,600,210.

(51) Int. Cl.
*G06K 9/00* (2006.01)
*G06T 7/80* (2017.01)
*G06N 3/08* (2006.01)

(52) U.S. Cl.
CPC ............ *G06T 7/80* (2017.01); *G06K 9/00724* (2013.01); *G06K 9/00744* (2013.01); *G06K 9/00758* (2013.01); *G06N 3/08* (2013.01)

(58) Field of Classification Search
CPC .. G06T 7/80; G06K 9/00758; G06K 9/00724; G06K 9/00744; G06N 3/08
(Continued)

(56) References Cited

U.S. PATENT DOCUMENTS 7,343,278 B2   3/2008   Billinghurst et al.
8,755,569 B2   6/2014   Shen et al.
(Continued)

OTHER PUBLICATIONS

Notice of Allowance, dated Nov. 12, 2019, from corresponding U.S. Appl. No. 16/521,761.

*Primary Examiner* — Charlotte M Baker
(74) *Attorney, Agent, or Firm* — Brient IP Law, LLC

(57) ABSTRACT

Data processing systems are disclosed for determining semantic and person keypoints for an environment and an image and matching the keypoints for the image to the keypoints for the environment. A homography is generated based on the keypoint matching and decomposed into a matrix. Camera parameters are then determined from the matrix. A plurality of random camera poses can be generated and used to project keypoints for an environment using image keypoints. The projected keypoints can be compared to the actual keypoints for the environment to determine an error and weighting for each of the random camera poses.

20 Claims, 6 Drawing Sheets

(58) Field of Classification Search
USPC .......................................................... 382/100
See application file for complete search history.

(56) References Cited

U.S. PATENT DOCUMENTS

| | | |
|---|---|---|
| 8,786,680 B2 | 7/2014 | Shiratori |
| 9,852,512 B2 * | 12/2017 | Gonzalez-Banos ......................... H04N 5/23229 |
| 10,417,781 B1 | 9/2019 | Konolige et al. |
| 10,438,362 B2 | 10/2019 | Lu et al. |
| 2018/0012411 A1 | 1/2018 | Richey et al. |
| 2019/0325595 A1 | 10/2019 | Stein et al. |

* cited by examiner

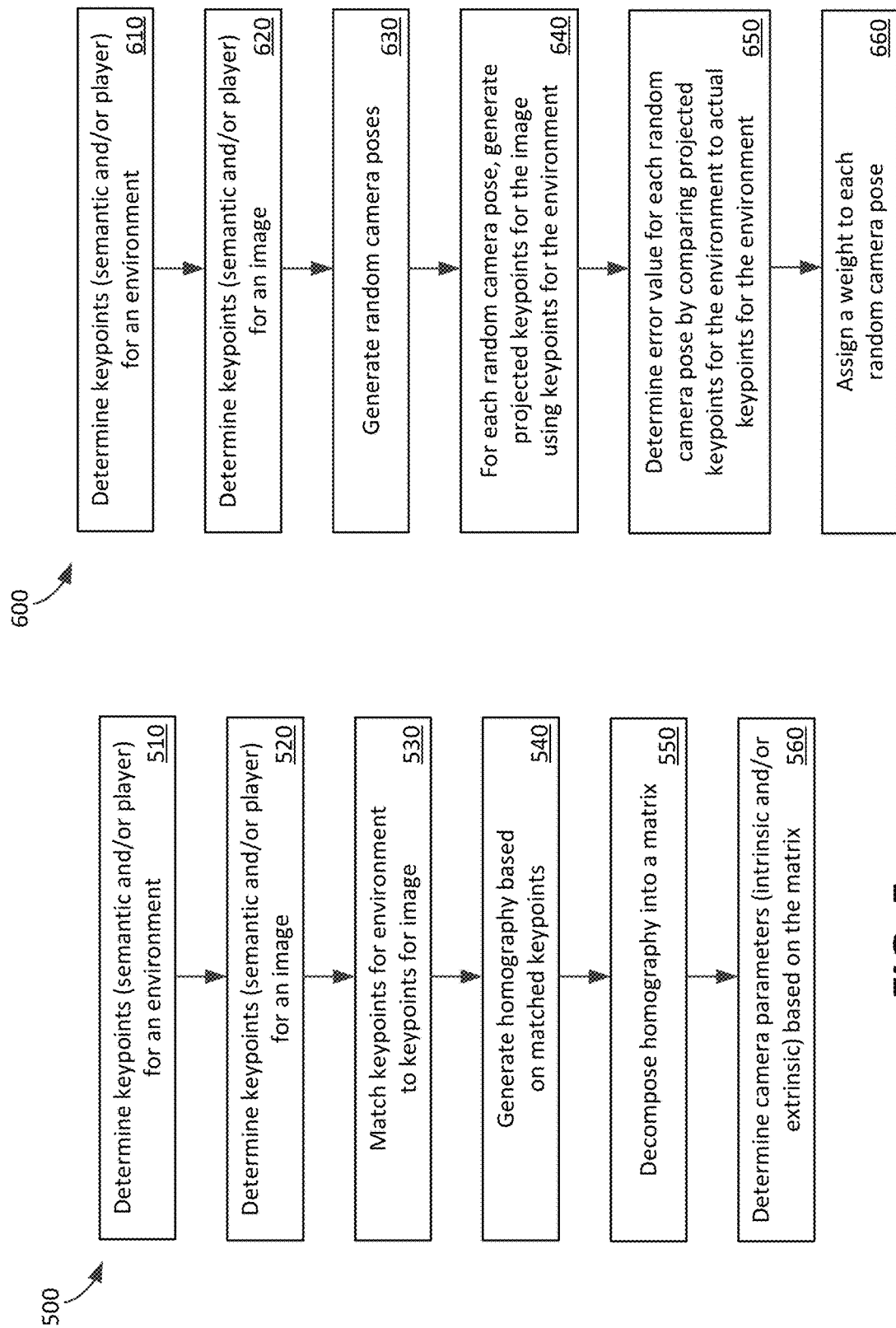

DATA PROCESSING SYSTEMS FOR REAL-TIME CAMERA PARAMETER ESTIMATION

CROSS-REFERENCE TO RELATED APPLICATIONS

This application is a continuation of U.S. patent application Ser. No. 16/521,761, entitled "Data Processing Systems for Real-Time Camera Parameter Estimation," filed Jul. 25, 2019, the entirety of which is hereby incorporated by reference.

BACKGROUND

Accurate camera registration (e.g., data indicating a location and positioning of a camera) is required for many current applications that use video data, such as augmented reality and three-dimensional (3D) reconstruction. To generate camera registration data for a camera in a well textured environment, many current technologies use multiple sensors to supplement data obtained from the camera. However, some environments make generating camera registration data in this manner difficult. For example, environments such as sports arenas may have many spatial markings, like well-marked lines. But such markings are typically configured in very repetitive patterns and with little texture differentiation from their surrounding surfaces, thus making such marking of limited utility in assisting with camera registration. Moreover, such environments may have poor lighting conditions and frequent, moving, occlusions (e.g., players, a ball).

Keypoint-based technologies that are commonly used for camera registration will frequently fail in environments like a sports arena. Edge and line information may be used as an alternative method of determining camera registration information, but methods using edge and line information require sensitive parametrization based on vanishing points, tend to be very slow, and do not generalize well to various scenarios. In another alternative, direct regression from an image to camera pose information can be used, but such methods fail to provide the needed accuracy.

The dimensions of a sports field or arena are likely to be known and 3D models of such environments may be available. Attempts have been made to identify projections of specific parts of such 3D models in an image and establish 3D-to-2D correspondences. These correspondences have been used to compute one or more camera parameters. However, the patterns in sports arenas and fields may be repetitive and the lighting may be poor. Occlusions may frequently be present in such environments and may be nearly constantly moving (e.g., players on the field or in the arena). Therefore, 3D-to-2D correspondences established using traditional methods, such as Scale Invariant Feature Transform (SIFT), Speed up Robust Feature (SURF), or Binary Robust Independent Elementary Features (BRIEF), may be unreliable, resulting in the frequent failure of camera pose estimation approaches that use these methods.

Other attempts have been made to overcome the difficulties of camera pose estimation in sporting environments by leveraging the specificities of sports fields or arenas without resorting to the use of additional sensors. In a soccer field example, the field may be large and the lines delimiting the field may be widely separated. As a result, in many camera views, too few lines may be visible for reliable camera registration. One effort to address this problem uses a two-point method, which, while potentially effective, may be very restrictive because such a method may require prior knowledge of a position and a rotation axis of a camera.

A mathematical characterization of a feature of a sporting environment, such as a central circle of a soccer field, has been used to assist in overcoming a shortage of features and may help estimate a homography. Similarly, points, lines, and/or ellipses may be used to localize sporting environments. While these methods may be effective for views of a specific sporting environment or type of environment, such methods lack general applicability to varying types of environments.

Homography estimation may use a dictionary of precomputed synthetic edge images and corresponding poses. For example, for a given input image, a nearest-neighbor search may be performed to locate a most similar neighbor stored in a database. When used with a video sequence, such homography estimation techniques may enforce temporal consistency and smoothness over generated homography estimates over time. However, a limiting factor of such techniques is the variability of potential poses of figures in an image and neighbor figures that may be used to locate nearest-neighbors in a database, which may require a very large dictionary.

In another attempt at pose estimation, the homography relating an image plane to a soccer field has been estimated using a branch and bound inference in a Markov random field (MRF) whose energy may be minimized when the image and a generative model agree. The image may first be segmented using a deep network to locate lines, circles, and grassy areas, and then vanishing points estimated. The estimated vanishing points may be used to constrain the search for a homography matrix and accelerate energy minimization. However, dependence upon correct estimations of vanishing points reveals a vulnerability in this approach because vanishing point estimation computations are known to be error-prone, especially when there is severe perspective distortion present.

SUMMARY

This Summary is provided to introduce a selection of concepts in a simplified form that are further described below in the Detailed Description. This Summary is not intended to identify key features and/or essential features of the claimed subject matter, nor is it intended to be used to limit the scope of the claimed subject matter.

Data processing systems, methods, and computer-readable media are disclosed for training a neural network to determine semantic keypoints and person keypoints using a plurality of image sequences, wherein the plurality of image sequences comprises image sequences of varying image sequence temporal length and image sequences of varying viewpoint. Semantic keypoints for an environment and an image may be received from the neural network. Person keypoints for the environment and for the image may also be received from the neural network. Each of the semantic keypoints for the environment may be matched to a respective semantic keypoint for the image and each of the person keypoints for the environment may be matched to a respective player keypoint for the image. A homography based on the matching of each of the semantic keypoints for the environment to the respective semantic keypoint for the image may be generated and decomposed into an intrinsic parameter matrix and an extrinsic parameter matrix. The extrinsic parameter matrix may be filtered using a particle filter. A camera focal length may be determined based on the intrinsic parameter matrix and a camera pose may be determined based on the filtered extrinsic parameter matrix.

Data processing systems, methods, and computer-readable media are also disclosed for determining semantic keypoints for an environment and for an image and determining person keypoints for the environment and for the image. The disclosed embodiments may match each of the semantic keypoints for the environment to a respective semantic keypoint for the image and match each of the person keypoints for the environment to a respective person keypoint for the image. The disclosed embodiments may generate a homography based on: (1) the matching of each of the semantic keypoints for the environment to the respective semantic keypoint for the image; and (2) the matching of each of the person keypoints for the environment to the respective person keypoint for the image. The disclosed embodiments may decompose the homography into a matrix and determine a camera parameter based on the matrix.

Data processing systems, methods, and computer-readable media are also disclosed for determining semantic keypoints for an environment and for an image. The disclosed embodiments may generate a plurality of random camera poses. For each random camera pose of the plurality of random camera poses, the disclosed embodiments may generate projected semantic keypoints for the image based on the semantic keypoints for the environment and the random camera pose and determine an error value for the random camera pose based on a comparison of the projected semantic keypoints for the image and corresponding semantic keypoints for the image. The disclosed embodiments may assign a weight to the random camera pose based on the determined error value.

Data processing systems, methods, and computer-readable media are also disclosed for determining semantic keypoints for an environment and for an image and determining person keypoints for an environment and for an image. The disclosed embodiments may generate a plurality of random camera poses. For each random camera pose of the plurality of random camera poses, the disclosed embodiments may generate projected semantic keypoints for the environment based on the semantic keypoints for the image and the random camera pose and projected person keypoints for the environment based on the person keypoints for the image and the random camera pose. The disclosed embodiments may determine an error value for the random camera pose based on a comparison of the projected semantic keypoints for the environment and corresponding semantic keypoints for the environment and a comparison of the projected person keypoints for the environment and corresponding person keypoints for the environment. The disclosed embodiments may assign a weight to the random camera pose based on the error value.

BRIEF DESCRIPTION OF THE DRAWINGS

Various embodiments of real-time camera parameter estimation systems and methods are described below. In the course of this description, references will be made to the accompanying drawings, which are not necessarily drawn to scale, and wherein:

FIG. 5 is a block diagram of an exemplary, non-limiting method of implementing real-time camera parameter estimation.

FIG. 6 is a block diagram of another exemplary, non-limiting method of implementing real-time camera parameter estimation.

DETAILED DESCRIPTION

A detailed description of example embodiments will now be described with reference to the various figures. Although this description provides a detailed example of possible implementations, it should be noted that the details are intended to be examples and in no way limit the scope of the application. As used herein, the article "a" or "an," absent further qualification or characterization, may be understood to mean "one or more" or "at least one," for example.

The instant disclosure describes embodiments of systems and methods for real-time camera parameter estimation. There are two types of camera parameters, intrinsic and extrinsic. Intrinsic camera parameters are parameters internal to a camera, such as focal length. Extrinsic camera parameters are parameters associated with external aspects of the camera and its relationship to the outside world, such as camera pose, which may include the position and orientation of a camera. Knowledge of camera parameters, which may also be referred to as camera "registration," is important to many applications that use image and video data, such as augmented reality and 3D reconstruction.

Various embodiments of the disclosed systems and methods for real-time camera parameter estimation may be used to determine a camera's parameters based solely on images captured in an environment by that camera without having any other knowledge of the camera's intrinsic or extrinsic characteristics. Using an image of an environment captured with a camera, the disclosed systems and methods map keypoints (e.g., physical markings and players) in the image to their corresponding keypoints in the environment. A homography may be generated based on this mapping that then allows for the determination of the camera parameters using methods described in more detail below. Various systems and methods for refining and reducing error in the determination of camera parameters are set forth herein.

Figure 1:
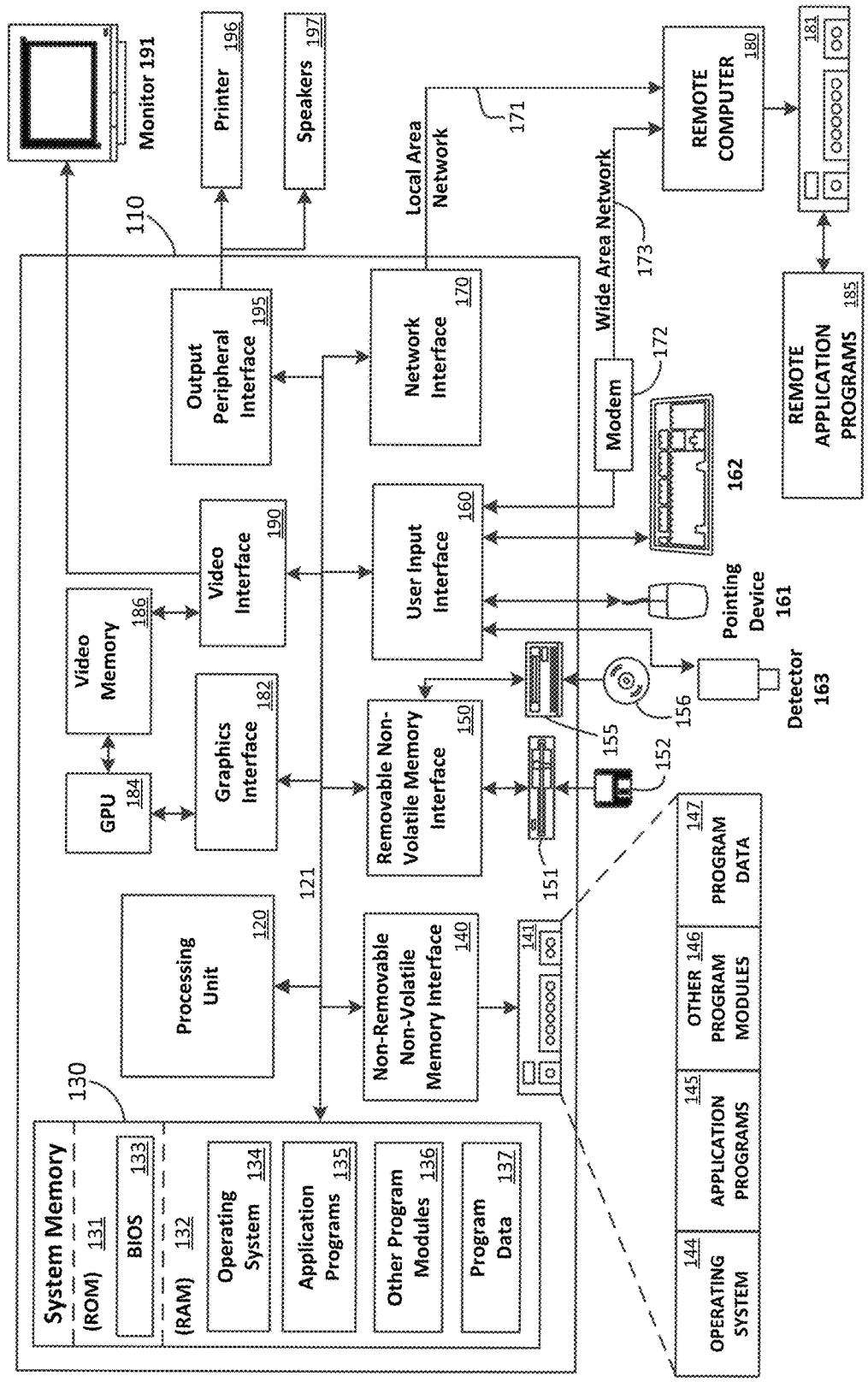
FIG. 1 is a block diagram representing an exemplary, non-limiting computing device in which various embodiments of the present disclosure or parts thereof may be implemented.

FIG. 1 and the following discussion are intended to provide a brief general description of a suitable computing environment in which various embodiments of the present disclosure or parts thereof may be implemented. It should be understood, however, that handheld, portable and other computing devices and computing objects of all suitable kinds are contemplated for use in connection with the present disclosure, as described above. Thus, while a general purpose computer is described herein, this is but one example, and the present disclosure may be implemented with other computing devices and systems and any combination of computing devices and systems, such as a thin client having network/bus interoperability and interaction, mobile devices operating alone or in conjunction with other devices, and networks of devices operating in conjunction with one another. The present disclosure may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that a real-time camera parameter estimation system may be implemented is a desirable, or suitable, environment for the real-time camera parameter estimation systems of the disclosure.

Although not required, the present disclosure can be implemented via an operating system, for use by a developer of services for a device or object, and/or included within application software that operates in connection with a real-time camera parameter estimation system. Software may be described in the general context of computer-executable instructions, such as program modules, being executed by one or more computers, such as client workstations, servers, gaming consoles, mobile devices, or other devices. Generally, program modules include routines, programs, objects, components, data structures and the like that perform particular tasks or implement particular abstract data types. Typically, the functionality of program modules may be combined or distributed as desired in various embodiments. Moreover, those skilled in the art will appreciate that the present disclosure may be practiced with other computer system configurations. Other well-known computing systems, environments, and/or configurations that may be suitable for use with the present subject matter include, but are not limited to, artificial neural networks, convolutional neural networks (e.g., U-Net), personal computers (PCs), gaming consoles, automated teller machines, server computers, hand-held devices, laptop devices, multi-processor systems, microprocessor-based systems, programmable consumer electronics, network PCs, appliances, environmental control elements, minicomputers, mainframe computers, digital cameras, smartphones, wireless telephones, and the like. The disclosure may also be practiced in distributed computing environments where tasks are performed by remote processing devices that are linked through a communications network/bus or other data transmission medium, as described herein in regard to FIG. 2. In a distributed computing environment, program modules may be located in both local and remote computer storage media including memory storage devices, and client nodes may in turn behave as server nodes.

FIG. 1 thus illustrates an example of a suitable computing system environment 100 in which the present subject matter or parts thereof may be implemented, although as made clear above, computing system environment 100 is only one example of a suitable computing environment and is not intended to suggest any limitation as to the scope of use or functionality of the disclosure. Devices functioning as components or parts of a real-time camera parameter estimation system may be implemented using a system such as computing system environment 100, but those skilled in the art will recognize that there are other appropriate systems in which to implement the present disclosure. Computing system environment 100 should not be interpreted as having any dependency or requirement relating to any one or combination of components illustrated in the exemplary operating environment 100.

With reference to FIG. 1, an exemplary system for implementing the disclosure includes a general-purpose computing device in the form of a computer 110. Components of computer 110 may include, but are not limited to, a processing unit 120, a system memory 130, and a system bus 121 that couples various system components including the system memory to the processing unit 120. Processing unit 120 represents any one or more processors that may be communicatively connected using any means. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus.)

Computer 110 typically includes a variety of computer-readable media. Computer-readable media can be any available media that can be accessed by computer 110 and includes both volatile and nonvolatile media and removable and non-removable media. By way of example, and not limitation, computer-readable media may comprise computer storage media and communication media. Computer storage media includes both volatile and nonvolatile and removable and non-removable media implemented in any method or technology for storage of information such as computer-readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), digital versatile disks (DVD) or other optical disk storage, magnetic cassettes, magnetic tape, magnetic disk storage or other magnetic storage devices, or any other medium that can be used to store the desired information and that can accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

System memory 130 includes computer storage media in the form of volatile and/or nonvolatile memory such as read only memory (ROM) 131 and random-access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

Computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 141 is typically connected to the system bus 121 through a non-removable memory interface such as interface 140, and magnetic disk drive 151 and optical disk drive 155 are typically connected to system bus 121 by a removable memory interface, such as interface 150.

The drives and their associated computer storage media discussed above and illustrated in FIG. 1 provide storage of computer-readable instructions, computer-executable instructions, data structures, program modules and other data for computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into computer 110 through input devices such as a keyboard 162 and pointing device 161, commonly referred to as a mouse, trackball or touch pad. Alternatively, pointing device 161 may be a controller used with a gaming console. Detector 163 may communicate with computer 110 through interface 160 to provide images, video frames, and/or other detected information or data to computer 110. Detector 163 may be a camera of any type, or any other type of detection device. Other input devices (not shown) may include a microphone, joystick, game pad, satellite dish, scanner, or the like.

These and other input devices may be connected to processing unit 120 through a user input interface 160 that may be coupled to system bus 121 but may be connected by other interface and bus structures, such as a parallel port, game port or a universal serial bus (USB). A graphics interface 182 may also be connected to system bus 121. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device may also connect to system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

Computer 110 may operate in a networked or distributed environment using logical connections to one or more remote computers, such as a remote computer 180. Remote computer 180 may be a personal computer, a server, a router, a network PC, a peer device or other common network node, and typically includes many or all of the elements described above relative to computer 110, although only a memory storage device 181 has been illustrated in FIG. 1. The logical connections depicted in FIG. 1 include a local area network (LAN) 171 and a wide area network (WAN) 173, but may also include other networks/buses, including wireless networks. Such networking environments are commonplace in homes, offices, enterprise-wide computer networks, intranets and the Internet.

When used in a LAN networking environment, computer 110 is connected to LAN 171 through a network interface or adapter 170. When used in a WAN networking environment, computer 110 typically includes a modem 172 or other means for establishing communications over WAN 173, such as the Internet. Modem 172, which may be internal or external, may be connected to system bus 121 via user input interface 160, or other appropriate mechanism. In a networked environment, program modules depicted relative to computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers, including all wired and wireless means, may be used.

Figure 2:
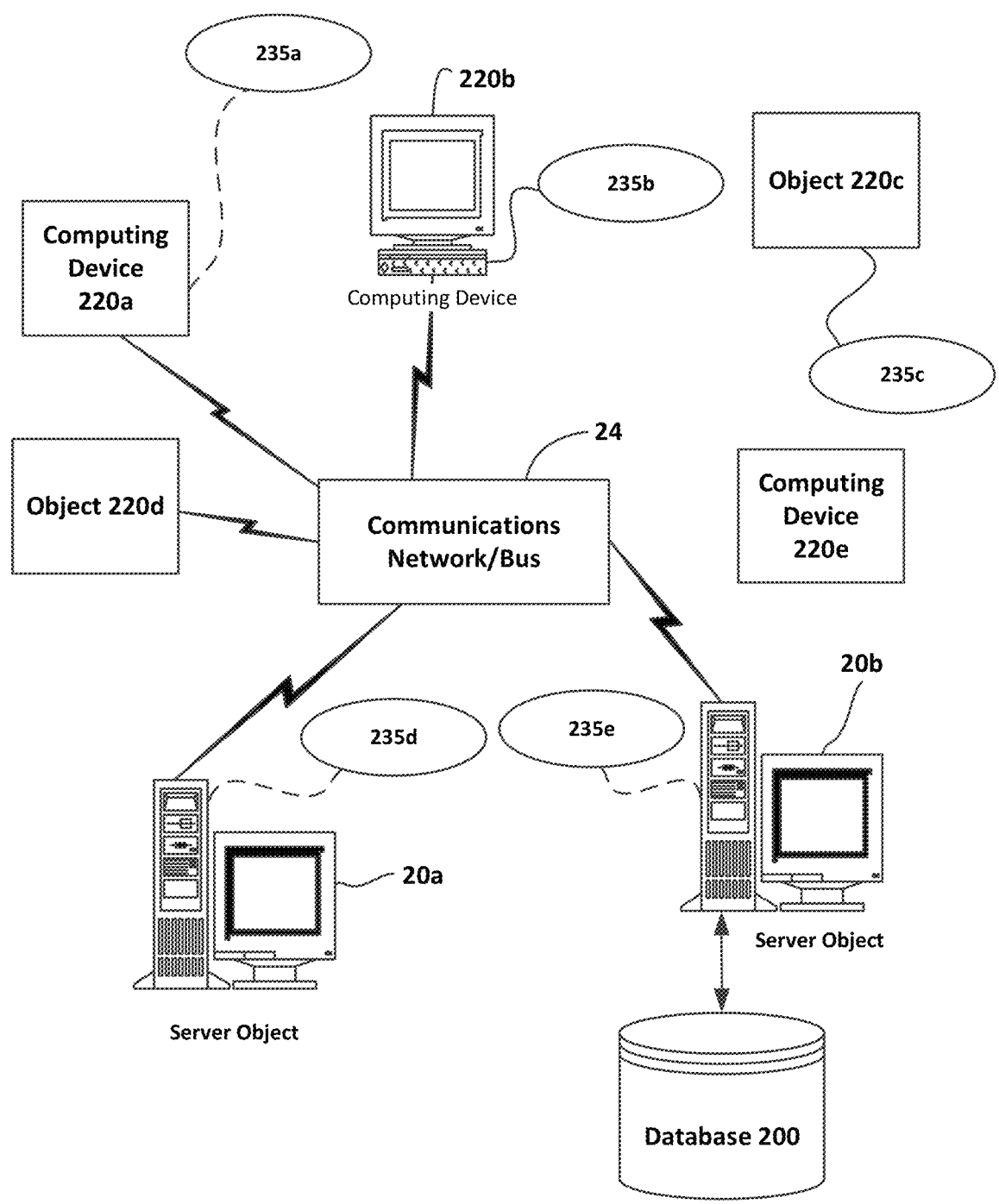
FIG. 2 is a block diagram representing an exemplary network environment having a variety of computing devices in which various embodiments the present disclosure or parts thereof may be implemented.

FIG. 2 provides a schematic diagram of an exemplary networked or distributed system in which one or more real-time camera parameter estimation systems may be implemented, in some embodiments as part of a virtual or augmented reality environment system. The distributed system comprises server computing objects 20a, 20b, etc. and computing objects or devices 220a, 220b, 220c, etc. These objects may be personal computers, gaming consoles, portable devices, mobile communications devices, or any other computing device. These objects may comprise programs, methods, data stores, programmable logic, etc. The objects may comprise portions of the same or different devices such as personal digital assistants (PDAs), televisions, Moving Picture Experts Group (MPEG-1) Audio Layer-3 (MP3) players, televisions, personal computers, etc. Each object can communicate with another object by way of the communications network 84. This network may itself comprise other computing objects and computing devices that provide services to the system of FIG. 2. This network may include wired and/or wireless components. In accordance with an aspect of the present disclosure, each object 20a, 20b, etc. or 220a, 220b, 220c, etc. may contain an application that might function as a component or element of a real-time camera parameter estimation system.

In a distributed computing architecture, computers, which may have traditionally been used solely as clients, communicate directly among themselves and can act as both clients and servers, assuming whatever role is most efficient for the network or the virtual or augmented reality environment system. This reduces the load on servers and allows all of the clients to access resources available on other clients, thereby increasing the capability and efficiency of the entire network. A virtual or augmented reality environment system or a real-time camera parameter estimation system in accordance with the present disclosure may thus be distributed among servers and clients, acting in a way that is more efficient for the entire system.

Distributed computing can help users of real-time camera parameter estimation systems interact and participate in a virtual or augmented reality environment across diverse geographic boundaries or at various location in a large area, such as a sporting environment. Moreover, distributed computing can move data closer to the point where data is consumed, acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally, and/or determine anomalous behavior such as a virus and stop it before it affects the network. All sorts of other services are contemplated as well. Since a virtual or augmented reality environment system may in practice be physically located in one or more locations, the ability to distribute information and data associated with a virtual or augmented reality environment system is of great utility in such a system.

It will also be appreciated that an object, such as 220*c*, may be hosted on another computing device 20*a*, 20*b*, etc. or 220*a*, 220*b*, etc. Thus, although the physical environment depicted may show the connected devices as computers, such illustration is merely exemplary and the physical environment may alternatively be depicted or described comprising various digital devices such as gaming consoles, PDAs, televisions, mobile telephones, cameras, detectors, etc., software objects such as interfaces, COM objects and the like.

There are a variety of systems, components, and network configurations that may support real-time camera parameter estimation systems. For example, computing systems and detectors or cameras may be connected together by wired or wireless systems, by local networks, or by widely distributed networks. Currently, many networks are coupled to the Internet, which provides the infrastructure for widely distributed computing and encompasses many different networks. Distributed systems that may support the implementation of various embodiments also include artificial neural networks and convolutional neural networks.

"The Internet" commonly refers to the collection of networks and gateways that utilize the Transport Control Protocol/Interface Program (TCP/IP) suite of protocols, which are well-known in the art of computer networking. The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, computers 220*a*, 220*b*, etc. can be thought of as clients and computers 20*a*, 20*b*, etc. can be thought of as the server where server 20*a*, 20*b*, etc. maintains the data that is then replicated in the client computers 220*a*, 220*b*, etc.

A server is typically a remote computer system accessible over a local network such as a LAN or a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a URL address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present disclosure may be employed. In more detail, a number of servers 20*a*, 20*b*, etc., are interconnected via a communications network/bus 24, which may be a LAN, WAN, intranet, the Internet, etc., with a number of client or remote computing devices 220*a*, 220*b*, 220*c*, 220*d*, 220*e*, etc., such as a portable computer, handheld computer, thin client, networked appliance, mobile telephone, personal computer, gaming console, or other device, in accordance with the present disclosure. It is thus contemplated that the present disclosure may apply to any computing device that may communicate, interact, and/or operate in or with a real-time camera parameter estimation system.

In a network environment in which the communications network/bus 24 is the Internet, for example, the servers 20*a*, 20*b*, etc. can be web servers with which the clients 220*a*, 220*b*, 220*c*, 220*d*, 220*e*, etc. communicate via any of a number of known protocols such as HTTP. Servers 20*a*, 20*b*, etc. may also serve as clients 220*a*, 220*b*, 220*c*, 220*d*, 220*e*, etc., as may be characteristic of a distributed virtual environment or a distributed real-time camera parameter estimation system. Communications may be wired or wireless, where appropriate. Client devices 220*a*, 220*b*, 220*c*, 220*d*, 220*e*, etc. may or may not communicate via communications network/bus 24 and may have independent communications associated therewith. Each client computer 220*a*, 220*b*, 220*c*, 220*d*, 220*e*, etc. and server computer 20*a*, 20*b*, etc. may be equipped with various application program modules or objects 235 and with connections or access to various types of storage elements or objects, across which files, images, or frames may be stored or to which portion(s) of files, images, or frames may be downloaded or migrated. Any computers 20*a*, 20*b*, 220*a*, 220*b*, 220*c*, 220*d*, 220*e*, etc. may be responsible for the maintenance and updating of database 200 or other storage element in accordance with the present subject matter, such as a database or memory 200 for storing real-time camera parameter estimation system data, such as captured, augmented, and/or modified files, images, and/or frames. Database 200 and one or more of computers 20*a*, 20*b*, 220*a*, 220*b*, 220*c*, 220*d*, 220*e*, etc., may form elements of a real-time camera parameter estimation system as described herein that may interact or be a component of a real-time camera parameter estimation system according to the present disclosure. Thus, the present disclosure can be utilized in a computer network environment having client computers 220*a*, 220*b*, 220*c*, 220*d*, 220*e*, etc. that can access and interact with a computer network/bus 24 and server computers 20a, 20b, etc. that may interact with client computers 220a, 220b, 220c, 220d, 220e, etc. and other like devices, and databases 200.

A moving and uncalibrated camera, for example, a camera of a smartphone (e.g., device 401), may be used to capture images and generate a sequence of images. Each image in such a sequence of images may include image data of a portion of a sporting environment (e.g., a sports field). Various embodiments provide a means for determining a focal length and one or more camera parameters for each such image in the image sequence in real-time, or near real-time, without using previously obtained knowledge of the position and orientation of the camera. Either or both of two information sources may be used determine the focal length and camera parameter(s). The first information source that may be used is field features, such as lines painted on the ground, intersections of such lines, termination points of such lines, and corners defined by such lines. This first information source may be referred to as "semantic keypoints." The second information source that may be used is person features, such as the locations of players, referees, and any other people on a playing field. Other attributes of such people on the field are also contemplated. This second information source may be referred to as "person keypoints." Keypoints associated with moving objects (e.g., balls, flags, pucks, etc.) may also be referred to as "person keypoints" herein. Person keypoints may be determined or obtained from a tracking system that may be configured to track movable points, such as people participating in a sporting event.

Figure 3:
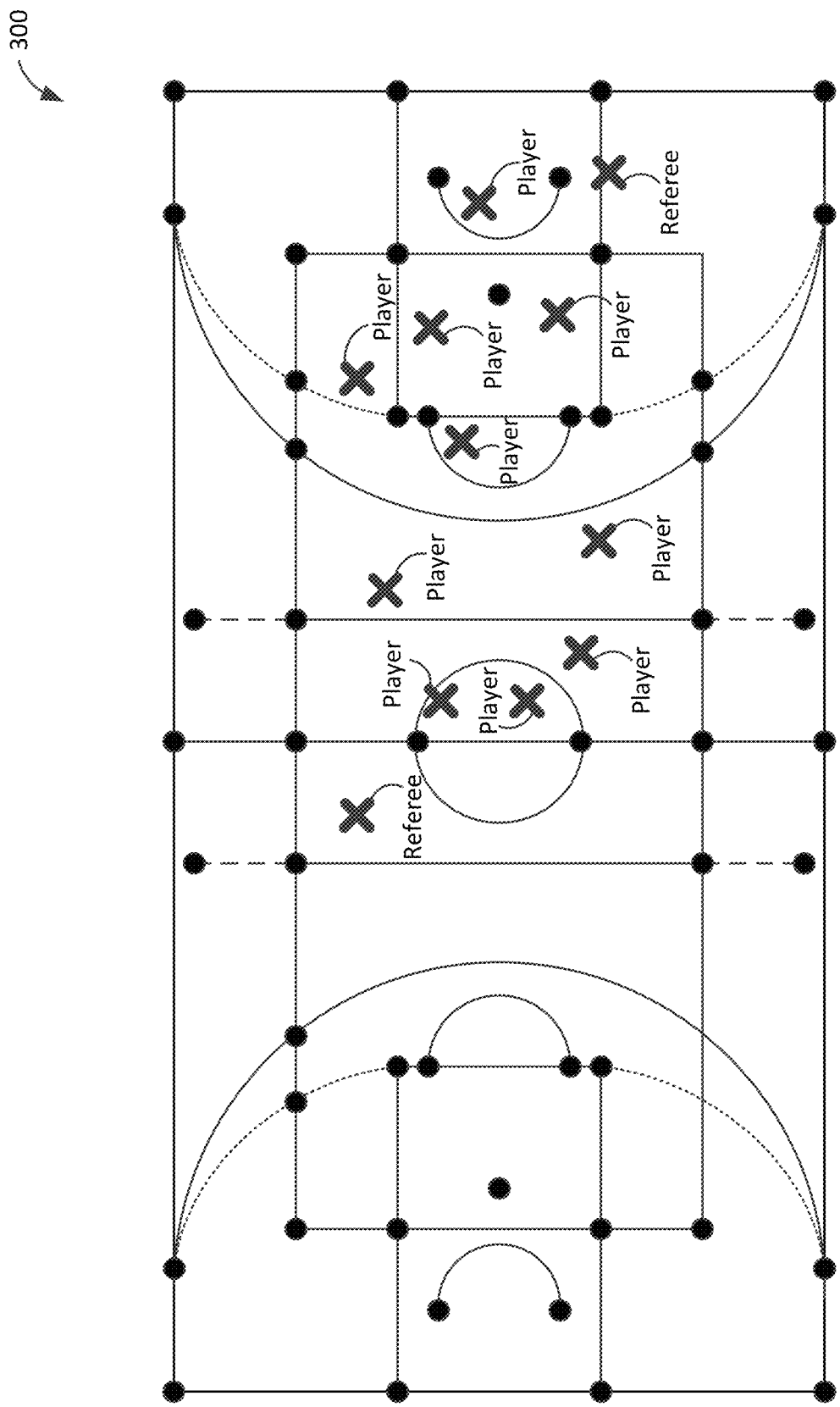
FIG. 3 is a block diagram representing an exemplary sporting environment.

FIG. 3 is diagram showing example sports field 300 according to various embodiments. As can be seen, sports field 300 includes numerous lines configured on the field in specific orientations. Each dot shown on sports field 300 represents an intersection of such lines, a termination point of such lines, and/or a corner defined by such lines on sports field 300. Thus, each dot represents a semantic keypoint. A unique identity may be assigned to each semantic keypoint.

Each cross, or "X," on sports field 300 represents a person's location on sports field 300. Thus, each cross represents a person keypoint. A unique identity may be assigned to each person keypoint. Note that in an embodiment, each person's location may be based on a projection of that person's center of mass onto the surface of sports field 300. Note that in some embodiments, a specific identity may not be assigned to each keypoint of one or both of semantic keypoints and person keypoints. The locations of semantic and person keypoints may be known, or otherwise determined, relative to a world coordinate system.

Figure 4:
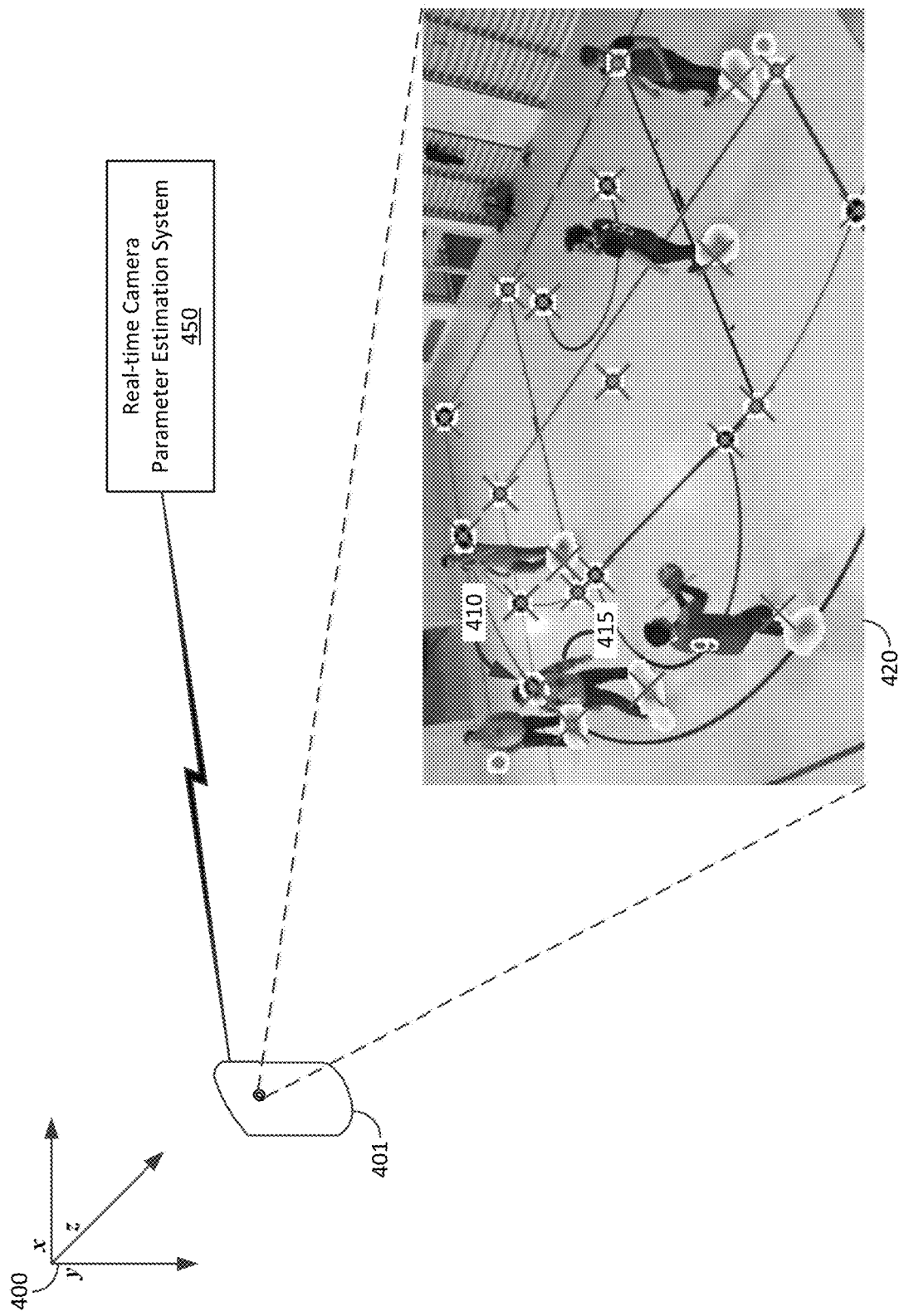
FIG. 4 is a block diagram representing an exemplary system for performing real-time camera parameter estimation.

FIG. 4 illustrates a camera capturing an image in a sporting environment.

During many public events today, participants and spectators often capture images with portable devices, such as smartphones, by taking pictures or recording video. In FIG. 4, a spectator may capture image 420 by operating a camera of device 401. Device 401 may be any device that may include a camera, such as a smartphone. Using various embodiments, a focal length of the camera of device 401 may be determined, and a pose (e.g., orientation and position) relative to world coordinate system 400 may be determined based on image 420. Image 420 may be provided to, or otherwise obtained by, real-time camera parameter estimation system 450, which may be any system implementing the disclosed aspects. In many embodiments, there will be multiple cameras capturing images that may be provided to system 450 for processing according to various embodiments. For example, thousands of fans may be taking pictures and/or video of a particular sporting event, and a large portion of such image data may be provided (e.g., in real time) to a real-time camera parameter estimation system.

In an embodiment, camera parameter determinations may be performed by a neural net architecture, such as a fully-convolutional U-Net architecture. Such an architecture may be used to help overcome difficult issues such as poorly textured environments or difficult light conditions. The disclosed architecture may combine global information with local information to simultaneously obtain descriptions and accurate localizations for one or both of semantic and person keypoints. In an embodiment, once semantic keypoints are localized in an image, a first estimate of a homography mapping the image plane to the field may be generated using the semantic keypoints. In some embodiments, person keypoints may also be localized in an image. In such embodiments, the first estimate may be refined using the person keypoints. The homography may be then decomposed into intrinsic and extrinsic parameters. Robustness over time may be enforced by use of a particle filter.

FIG. 5 includes a block diagram representing exemplary method 500 of estimating camera parameters (e.g., in real time, or at least substantially in real time). In various embodiments, these steps may be executed by one or more processors of any suitable computing device of FIG. 2. In various embodiments, the steps of this method may be implemented by a central server. For example, the various steps of method 500, or any subset thereof, may be implemented in any order by any of devices 220a, 220b, 220c of FIG. 2. In addition, or instead, the various steps of method 500, or any subset thereof, may be implemented in any order by a computing device executing a program module, such as module 146 of FIG. 1.

At block 510, keypoints may be determined for an environment. Such determinations may be made using knowledge of the environment obtained using any means. For example, if an environment is a sporting arena or sporting field, 3D coordinates of markings, such as lines on a playfield, are typically available. In an embodiment, these coordinates, or similar data, may be used to determine semantic keypoints for the environment. Semantic keypoints may each be assigned a unique identity.

Often, locations of players on such a field may also be known. This information may be used to determine person keypoints. For example, projections of the center of mass of each player onto the ground plane of the field may be used to determine the location of the respective keypoints. Person keypoints may, in some embodiments, not each be assigned a unique identity.

At block 520, keypoints may be determined for an image. Such determinations may be made using an artificial neural network to identify and classify pixels of the image, for example, by assigning particular pixels to a class associated with a person keypoint, a semantic keypoint, or no keypoint (i.e., a background portion of the image).

At block 530, keypoints for the environment determined at block 510 may be matched to respective corresponding keypoints for the image determined at block 520. Based upon this matching, at block 540, a homography (e.g., an estimated homography) may be generated. At block 550, the generated homography may be decomposed into one or more matrices, each of which may then be used to determine, or estimate, camera parameters. Such parameters may include extrinsic parameters (e.g., pose, position, orientation) and/or intrinsic parameters (e.g., focal length).

A sequence of images of an environment, such as a sporting environment, may include a number T of images. Such a sequence may be represented as $\{I^t\}_{t=1}^{T}$, where $I^t$ represents an image I at time t. Such images may be captured or otherwise generated by an uncalibrated camera (e.g., a camera for which a pose, position, and/or location information may be unknown). A pose of such a camera may be represented by a 3×4 transformation matrix (1), as shown below.

$$M^t = [R^t | t^t] \quad (1)$$

In matrix (1), R may be a rotation matrix and $t^t$ may be a translation vector. In an embodiment, $M^t$ may be parameterized by six extrinsic vectors. A camera's internal calibration may be represented by a 3×3 matrix $K^t$ that may be parameterized by five internal parameters. For each image of a sequence of images, state vector (2), as shown below, may be determined.

$$X^t = [K^t | M^t] \quad (2)$$

In an embodiment, complete, or relatively complete, knowledge of a 3D structure of an environment in which images have been captured may be available. Such knowledge may include world coordinates that may be represented as $Z_S$ of a set of semantic keypoints in the sporting environment. Such semantic keypoints may be manually selected and constant, such as the dots shown on sports field 300 of FIG. 3, each of which represents an intersection of lines on sports field 300, a termination point of such lines, and/or a corner defined by such lines. For example, sports field 300 may be a basketball court, where semantic keypoints may be defined by the intersections of the side lines with the midcourt line, the corners created where the end lines and the side lines meet, the intersections of the three-point lines with the side lines, etc.

Alternatively, or in addition, knowledge of positions of players, referees, and/or other people on a sports field at a time t may be available, for example, from a system that uses fixed cameras in a sporting environment to estimate the positions of such people. Such positions, referred to as person keypoints, may be world coordinates $Z_P^t$ representing a projection of a player's, referee's, or other person's center of gravity onto the ground plane. Examples of such person keypoints are shown in FIG. 3 as crosses, or Xs, on sports field 300.

For an image $I^t$ of a sequence of images, 2D image locations of semantic keypoints $\hat{z}_S^t$ and/or person keypoints $\hat{z}_P^t$ may be estimated. The estimate of the 2D image location of a semantic keypoint may be matched to a known 3D location $Z_S^t$ of that semantic keypoint. Also, or alternatively, the estimate of the 2D image location of a person keypoint may be matched to a known 3D location $Z_P^t$ of that person keypoint. From these resulting 3D-to-2D correspondences, a homography $H^t$ between the ground plane and the image may be determined. Homography $H^t$ may be decomposed into $K^t$ and $M^t$.

In an embodiment, to detect semantic and/or person keypoints and determine their respective 2D locations in individual images of a sequence of images, an artificial neural network such as a U-Net deep network may be trained to jointly locate such keypoints. Such a network may be configured to perform pixel-wise classification with standard multi-class cross-entropy loss. This network may generate a volume that may encode an identity and a presence of a keypoint so that pixels within a distance b from the keypoint may be assigned a class corresponding to that keypoint.

Input to a network may be an RGB image $I \in \mathbb{R}^{H \times W \times 3}$ and output may be returned as a volume $V = \{V_0, \ldots, V_{J+1}\}$ that may be composed of J+2 channels where J is a number of semantic keypoints. Each such keypoint may have a unique identity, and therefore each of the channels $V_j$ in the range $\{1, \ldots, J\}$ may be correspond to a particular keypoint and may be used to encode a location for that keypoint.

Person keypoints within an image may all be assigned a same identity and therefore a single channel $V_{J+1}$ may be used to encode person keypoint locations.

For locations that have no associated keypoint, a background channel $V_0$ may be used, for example, to assign a class to those locations.

A projected j-th semantic keypoint may be represented by $z_{S|j}$. Its associated ground-truth channel may be represented by $V^*_j$. Each pixel that is at a distance b from the keypoint may be set to 1, while all other pixels may be set to 0. Similarly, the pixels of channel $V^*_{J+1}$ associated with a location of a keypoint may be set to 1 and all other pixels may be set to 0. Each pixel of a background channel $V^*_0$ may be set such that for any value at location $p \in \mathbb{R}^2$, the value satisfies $\Sigma_i V_i(p) = 1$.

The situation may arise of two keypoints being within a distance of 2b of one another. When this happens, the pixels of the overlapping area may be split between the keypoints, for example, evenly between the two.

The various embodiments may generate an output volume, $V \in [0, 1]$, that may encode a class probability for each pixel in an image. Each such class probability may be a probability of the corresponding pixel belonging to one of J+2 classes that may define keypoint identities and background. In an embodiment, this encoding may be achieved using a pixel-wise softmax layer or other means to assign probabilities to the pixels. During a training period, ground-truth keypoint locations $Z_S^t$ and $Z_P^t$ may be projected for a given image $I^t$ using an associated ground-truth homography. These projections may be used to create a ground-truth output volume $V \in \{0, 1\}$ as described herein. In addition to volume $V^*$, weights may be generated to compensate for one or more class imbalances.

Training data may include sequences of varying lengths that may be obtained from different viewpoints. Training data may include annotations for one or both of semantic keypoints and players keypoints. Training of the disclosed network may be performed in iterations. For each training iteration, batches of image sequences may be chosen based on the frequency of a viewpoint. For example, images from short (e.g., temporally brief) sequences may be selected more often than images from lengthy sequences. Because there are likely to be more short sequences than long sequences, where sequences are captured from many different viewpoints (e.g., by fans in a sports arena), the selection of sequences in this manner may result in a more even distribution of viewpoints.

To increase global context awareness, methods such as spatial dropout may be used during training to force the disclosed network to use information associated with a keypoint to infer the keypoint's position. In an embodiment, parts of an input image may be zeroed-out, for example, by using boxes drawn from a uniform distribution. As a result, keypoints may be correctly detected and localized even when they are occluded by a player. Referring again to FIG. 4, in example image 420, semantic keypoint 410 is obscured by player 415. The various embodiments may enable the localization of keypoint 410 despite the fact that keypoint 410 is occluded by player 415.

In various embodiments, keypoints defined on a plane may not overlap in projection. By accounting for this, various embodiments may drastically reduce inference time. Background channel $V_0$ may encode the information required to locate a keypoint. Non-minimum suppression may be performed on background channel $V_0$. The identities of keypoints may be assessed by determining an index of the maximum in a corresponding column in a volume. This may enable the processing of many more interest points in real-time than could otherwise be processed using other architectures, for example, architectures that use one output channel per point of interest, where finding actual locations may require performing non-maximum suppression in each channel separately.

In an embodiment, intrinsic parameters and/or extrinsic parameters may be estimated. Based on semantic keypoint locations $\hat{z}_S^t$ (e.g., markings on the ground created by lines on a field) and person keypoint locations $\hat{z}_P^t$ (e.g., projections of players' centers of gravity) in an image $I_t$, camera parameters may be estimated and/or determined. Where a camera focal length is not known, associated camera extrinsic parameters cannot typically be computed directly. Therefore, to determine such parameters, a homography $H^t$ may be determined from an image plane to a field. Next, intrinsic and the extrinsic parameters $K^t$ and $M^t$ may be determined from $H^t$ as described herein.

Semantic keypoint locations may facilitate estimation of a homography by using the unique identity assigned to such locations. These identities may translate into a 3D-to-2D correspondence between a 3D point on a sports field and a 2D image location. By contrast, exploiting person keypoints that each may be a projection of one of many 3D locations may require establishing such correspondences. Performing such computations using person keypoints may be extremely resource intensive.

To overcome this difficulty, in certain embodiments, an iterative approach may be used. Given image $I^t$, semantic keypoints may be used to determine a first estimate of a homography $H^t_0$. Locations $\hat{z}_S^t$ and $\hat{z}_P^t$ may be back-projected from the image plane to the world coordinate system. The back-projected points may be associated with the closest ground-truth positions. These newly defined correspondences may be used to estimate a new homography $H^t_1$, in one embodiment in conjunction with the use of random sample consensus (RANSAC). This process may be repeated until a number of inliers becomes constant, but in other embodiments a single iteration may be performed. This embodiment enables the use of players' data to produce a more accurate mapping that may translate to better estimates of a focal length and a pose of a camera.

Various embodiments may enforce temporal consistency of camera parameters for sequences of images. This is especially helpful where such sequences are captured by moving cameras, such as those found in smartphones, which may move due to hand movement and be jostled during a sporting event.

FIG. 6 includes a block diagram representing exemplary method 600 of enforcing temporal consistency of camera parameters. Method 600 is intended as a general overview of aspects of various embodiments. Each of the functions of method 600 may be implemented in a variety of ways, for which additional detail is set forth herein.

At block 610, keypoints may be determined for an environment. As noted elsewhere herein, such determinations may be made using knowledge of the environment obtained using any suitable means. For example, in sporting arena and fields, 3D coordinates of markings, such as lines on a field, are available. In an embodiment, these coordinates, or similar data, may be used to determine semantic keypoints for the environment. Semantic keypoints may each be assigned a unique identity. Often, locations of players on such a field may also be known. This information may be used to determine person keypoints. For example, projections of the center of mass of each player onto the ground plane of the field may be used to determine the location of the respective keypoints. Person keypoints may not each be assigned a unique identity.

At block 620, keypoints may be determined for an image. As noted elsewhere herein, such determinations may be made using an artificial neural network to identify and classify pixels of the image, for example, assigning pixels to a class associated with a person keypoint, a semantic keypoint, or no keypoint (i.e., background).

At block 630, random camera poses (e.g., a random set of extrinsic and/or intrinsic camera parameters) may be generated. At block 640, for each of these random camera poses, keypoints (semantic, player, or both) for the environment are projected based on the keypoints for the image as determined at block 620 and the parameters associated with the camera pose. At block 650, an error value may be determined for each camera pose based on comparing the projected keypoints for the environment generated at block 640 to the actual keypoints for the environment determined at block 610. This error value may be used at block 660 to assign a weight to each random camera pose. These weights can then be used in a determination of whether to retain or discard potential camera poses associated with a sequence of images.

Describing temporal consistency in more detail, keypoints may be found independently in individual images and used to determine a homography and derive camera parameters for each image. As noted, images may be captured by moving handheld cameras, the resulting video sequences may be affected by motion that may be shaky but not necessarily arbitrary. In an embodiment, a particle filtering approach, referred to herein as condensation, may be used to enforce temporal consistency on a pose $M^t$ and intrinsic parameter matrix $K^t$ may be updated at each iteration to allow the focal length to change.

A condensation algorithm may numerically approximate and refine a probability density function $p(M^t|\hat{z}^t)$ over time. A set of N random poses, which may be referred to as particles $s_n^t$, with associated weights may approximate the posterior distribution shown in equation (3), where $\delta(\cdot)$ may be the Dirac delta function.

$$p(M^t|\hat{z}^t) = \sum_{N=1}^{N} \pi_n^t \delta(m - s_n^t) \qquad (3)$$

At each iteration, particles may be generated, transformed, and/or discarded based their respective weights $\pi_n^t$. The larger a weight is for a given particle, the greater the probability that the particle will be retained. Weights may be selected such that particles that correspond to likely extrinsic parameters are assigned higher weights. Likely extrinsic parameters may be parameters that yield low re-projection errors.

Extrinsic parameters associated with particles may be used to project ground-truth 3D points and determine a mean error distance from projected 3D points to estimated positions $\hat{Z}^t$. For semantic keypoints, a distance $\xi_{S|n}^t$ to a corresponding predicted 2D location may be determined. For person keypoints where an identity for the keypoint is unknown, the detection closest to the projection may be determined and used to compute error $\xi_{P|n}^{t}$. A weight of particle n-th may be represented in equation (4) below, where $\sigma_S$ and $\sigma_G$ may control the importance of a particle based on its error and $\alpha$ may balance the two contributions. A new state may be represented by the expected value of the posterior shown in equation (5) below.

$$\pi_n^t = \alpha \, \exp\left[\left(\frac{-\xi_{S|n}^t}{\sqrt{2}\,\sigma_S}\right)^2\right] + (1-\alpha)\exp\left[\left(\frac{-\xi_{P|n}^t}{\sqrt{2}\,\sigma_P}\right)^2\right] \quad (4)$$

$$E[p(M^t \mid \hat{z}^t)] \approx \sum_{n=1}^{N} \pi_n^t s_n^t \quad (5)$$

As discussed, the instant disclosure provides embodiments that allow determining camera parameters based on a homography. An example image I may be represented as w×h and may have associated homography H between a ground plane and the image plane. Homography H may be decomposed into K=[R, t], a 3×3 matrix of intrinsic parameters, and M=[R, t], a 3×4 matrix of extrinsic parameters, as described herein. Thus, each of M and K may be derived from H.

To derive intrinsic parameters, because the principal point of modern cameras is typically located close to the center of the image and there is normally no skew may be used, K may be represented as shown below in equation (6), where f is an initially unknown focal length and the only parameter that may be estimated.

$$K = \begin{bmatrix} f & 0 & w/2 \\ 0 & f & h/2 \\ 0 & 0 & 1 \end{bmatrix} \quad (6)$$

With knowledge of H, two linear constraints on the intrinsic parameters may be solved for the unknown f which may yield two solutions of the forms shown in equations (7) and (8) below, where $h_1$ and $h_2$ are the first two columns of H, $h_7$ and $h_8$ the first two elements of H third row, and $g_1$ and $g_2$ are algebraic functions.

$$f_1 = \frac{g_1(h_1, h_2, w, h)}{h_7 \cdot h_8} \quad (7)$$

$$f_2 = \frac{g_2(h_1, h_2, w, h)}{(h_7 + h_8) * (h_7 - h_8)} \quad (8)$$

$f_1$ and $f_2$ are only defined when the denominators are non-zero. The closer the denominators are to zero, the lower the precision of $f_1$ and $f_2$. To compare the value of these denominators, the heuristic shown in equation (9) below may be used.

$$f = \begin{cases} f_1 & |h_7 \cdot h_8| > |(h_7 + h_8) * (h_7 - h_8)| \\ f_2 & \text{otherwise.} \end{cases} \quad (9)$$

To derive intrinsic parameters, rotation and translation matrices R and t may be extracted from H. 3×3 matrix B may be defined B=[$b_1$, $b_2$, $b_3$] and a scale factor $\lambda$ may be defined such that H may be represented as $\lambda$KB. $\lambda$ may be computed as $(\|K^{-1}h_1\|+\|K^{-1}h_2\|)/2$. Assuming that the x-axis and the y-axis define the ground plane, a first estimate of the rotation and translation matrices $\tilde{R}$=[$b_1$, $b_2$, $b_1 \times b_2$] and t=$b_3$ may be obtained. The rotation may be orthogonalized using singular value decomposition $\tilde{R}=U\Sigma V^T$, $R=UV^T$. The pose [R, t] may be refined on H by a non-linear least-squares minimization.

As noted herein, at each discrete time step t, 2D locations of keypoints $\hat{z}^t$ may be estimated. These estimated locations may be used to estimate the intrinsic and extrinsic parameters $M^t_d$ and $K^t$ for individual frames. The intrinsic parameters computed from a single frame may be sensitive to noise and may depend on the accuracy of $H^t$. To address potential noise and homography inaccuracies, at every time step t the values of intrinsic parameters may be estimated by considering the past k frames. Outliers over the past k estimates of the intrinsic parameters may be rejected and a median for the parameter computed, thereby increasing robustness and precision and facilitating smooth variations of the parameters over time. If a parameter is known to be constant over time, k may be set to take past estimates into account. Upon determination of the intrinsic parameters, a new robust pose $M^t$ may be obtained, and any error may be minimized (in the least-squares sense) using all the detected keypoints.

A particle-filter may be robust but may still fail if a camera moves very suddenly. To detect such events and re-initialize the filter, a number of 3D model points may be tracked for such model points whose reprojection falls within a distance t for the pose computed from point correspondences $\hat{M}_d^t$ and the filtered pose $\hat{M}^t$. When the count for $\hat{M}_d^t$ is higher, the filter may be re-initialized. A pseudo-code segment is listing below in Table 1 illustrated an example procedure for performing disclosed operation.

TABLE 1

Example pseudo-code for a real-time camera parameter estimation framework

Algorithm 1 1: procedure INTRINSICS AND EXTRINSICS ESTIMATION

Figure 7:
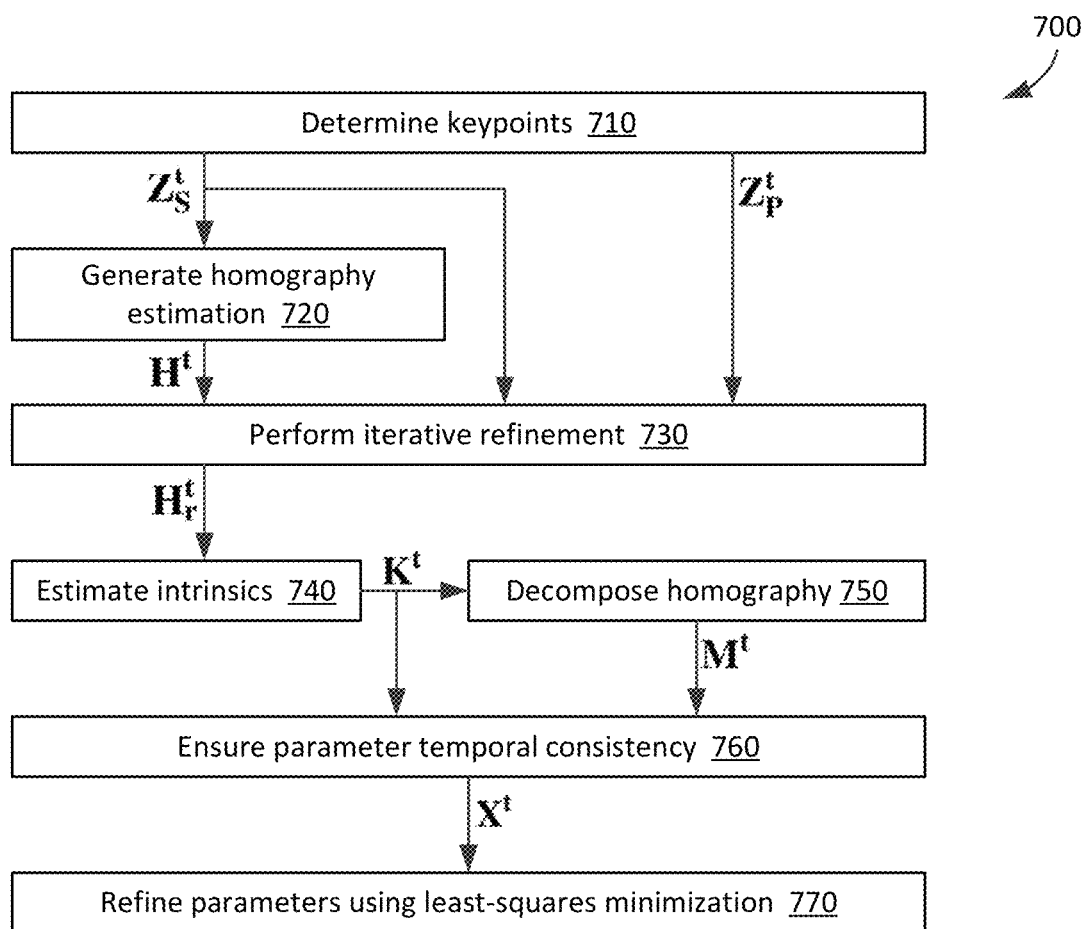
FIG. 7 is a block diagram of another exemplary, non-limiting method of implementing real-time camera parameter estimation.

2: for t = 1 to T: iterates over time
3:   —Single frame estimation—
4:   $\hat{z}^t = \{\hat{z}^t_S, \hat{z}^t_P\}$ ← detect keypoints from $I^t$
5:   $\hat{z}^t$ ← robust estimation using ($Z_S$, $\hat{z}^t_S$)
6:   $\hat{z}^t_r$ ← iterative refinement ($\hat{z}^t$, $Z^t$, $\hat{z}^t$)
7:   $\hat{z}^t$ ← intrinsics estimation from $\hat{z}^t_r$
8:   $\hat{z}^t_m$ ← moving median/w outliers rejection over $\hat{z}^{t:t-k}$
9:   $\hat{z}^t_d$ ← homography decomposition ($\hat{z}^t_m$, $\hat{z}^t_r$)
10:   —Particle Filtering—
11:   for n = 1 to N: iterates over the particles
12:     $\{s^t_n, \pi^t_n\}$ ← sampling with replacement from $\{s^{t-1}_n, \pi^{t-1}_n\}$
13:     $s^t_n \leftarrow s^t_n + w_n$ add randomness where $w_n \sim N(0, \Sigma)$
14:     $\pi^t_n \leftarrow g(s^t_n, Z_S, \hat{z}^t_S, Z^t_P, \hat{z}^t_P)$ weights computation
15:   endfor 16:   $\hat{M}^t \leftarrow \sum_{n=1}^{N} \pi^t_n s^t_n$ expected value as filter output 17:   $\hat{z}^t$ ← Levenberg-Marquardt refinement of $\hat{z}^t$ on $\hat{z}^t_r$
18:   —Filter re-initialization—
19:   if no. inliers($\hat{z}^t_m$, $\hat{z}^t_d$, $\hat{z}^t$) > no. inliers($\hat{z}^t_m$, $\hat{z}^t$, $\hat{z}^t$) then:
20:     for n = 1 to N:
21:       $\{s^t_n, \pi^t_n\}$ ← $\{\hat{z}^t_d + w_n, 1/N\}$ where $w_n \sim N(0, \Sigma)$
22:     endfor
23:   endif
Complete framework pseudo code.
end FIG. 7 illustrates a block diagram representing another exemplary method 700 of performing real-time camera parameter estimation. At block 710, the disclosed system may determine semantic and/or person keypoints. The disclosed systems may generate or estimate a homography at block 720, that may then be iteratively refined as described herein at block 730. The disclosed systems may estimate intrinsic parameters at block 740 and the homography may be decomposed at block 750. The disclosed systems may ensure temporal consistency of camera parameters as disclosed herein at block 760 and further refine the determined parameters at block 770.

EXAMPLE IMPLEMENTATIONS

Some example implementations and results will now be described, comparing them to other techniques of determining camera parameters. Results were evaluated using two metrics measuring the accuracy of the determined camera parameters. The first metric is the area under the curve (AUC) of the cumulative distribution of the normalized reprojection errors (NRE). The second metric is the intersection over union (IoU). To compute the reprojection error, estimated camera parameters were used to project a grid of points defining a playing surface and average their distances from their true locations. To ensure independence from the image size, the resulting values were normalized by the image height. AUC was computed by sorting the normalized reprojection errors in ascending order and by considering values lower than 0.1. IoU was computed as a shared area between the ground-truth model of the court and the reprojected model of the court divided by the area of the union of these two areas. The IoU is one if the two areas coincide exactly and zero if they do not overlap at all. Results from systems implemented according to the instant disclosure were compared to results obtained from systems using SIFT, PoseNet, brand and bound, and synthetic dictionary techniques. Various datasets were used as inputs to the systems operating according to the instant disclosure and systems operating according to other techniques.

In one example, a system implemented according to the instant disclosure obtained image sequences captured from a basketball game were captured using smartphones moving around the court. The game was also video-recorded using fixed and calibrated cameras configured about the court and output from these cameras was used to estimate players' positions on the ground plane of the environment. For each image captured by a smartphone, a system operating according to the instant disclosure estimated ground truth camera poses.

In another example, a system implemented according to the instant disclosure obtained image sequences from a volleyball game using broadcast cameras and determined players' positions. The system determined ground-truth poses and intrinsic parameters.

In yet another example, a system implemented according to the instant disclosure obtained image sequences from a soccer match captured using one moving smartphone and ten fixed cameras and determined players' positions. In this example, the focal length was the same for each image in a same sequence, but different for each sequence of images. The system determined ground-truth poses images captured from different locations around the court.

In yet another example, a system implemented according to the instant disclosure obtained image sequences from another soccer match that were not in sequence but have an associated homography. Here, the system extracted players' positions manually in each image.

For each of these examples, the systems operating according to various embodiments provided better results than systems operating according to other techniques, and usually vastly superior results. In some examples implemented according to the instant disclosure, the use of person keypoints greatly improved the results.

Although features and elements are described above in particular combinations, one of ordinary skill in the art will appreciate that each feature or element can be used alone or in any combination with the other features and elements. In addition, the methods described herein, and/or various steps of the methods, may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:
one or more computer processors configured as a neural network; and
memory storing computer-executable instructions that, when executed by the one or more computer processors, cause the one or more computer processors to perform operations comprising:
training the neural network to locate and identify semantic keypoints in an image sequence corresponding to keypoints in an environment, wherein each keypoint of the keypoints in the environment has a known location;
training the neural network to locate and identify person keypoints in the image sequence corresponding to the keypoints in the environment;
matching each semantic keypoint of the semantic keypoints in the image sequence to a respective semantic keypoint of the keypoints in the environment;
matching each person keypoint of the person keypoints in the image sequence to a respective person keypoint of the keypoints in the environment;
generating a homography for each image in the image based on the matching of each of the semantic keypoints in the image sequence to the respective semantic keypoint in the environment and the matching of each of the person keypoints in the image sequence to the respective person keypoint in the environment; and
determining a camera parameter based on the homography.

2. The system of claim 1, wherein determining the camera parameter comprises determining one or more camera parameters selected from a group consisting of:
(a) a camera focal length;
(b) a camera pose;
(c) a camera orientation; and
(d) a camera position.

3. The system of claim 2, wherein determining the camera parameter comprises determining the camera focal length, wherein determining the camera focal length comprises:

determining a first focal length based on a first algebraic function;
determining a second focal length based on a second algebraic function; and
determining the camera focal length based on a comparison of the first focal length and the second focal length.

4. The system of claim 2, wherein determining the camera parameter comprises determining the camera orientation, wherein determining the camera orientation comprises:
decomposing the homography into one or more matrices; and
determining the camera orientation based on the one or more matrices.

5. The system of claim 4, wherein decomposing the homography into the one or more matrices comprises decomposing the homography into one or more extrinsic parameter matrices; and
wherein determining the camera orientation based on the one or more matrices comprises determining the camera orientation based on the one or more extrinsic parameter matrices.

6. The system of claim 1, wherein each semantic keypoint of the keypoints in the environment is associated with one or more semantic keypoints selected from a group consisting of:
(a) an intersection of two or more lines configured in the environment;
(b) an endpoint of a line configured in the environment; and
(c) a corner formed by two or more lines configured in the environment.

7. The system of claim 2, wherein determining the camera parameter comprises determining the camera focal length, wherein determining the camera focal length comprises:
decomposing the homography into one or more intrinsic parameter matrices;
determining a set of intrinsic parameters based on the one or more intrinsic parameter matrices;
removing outliers from the set of intrinsic parameters to generate a subset of intrinsic parameters;
determining a median for each intrinsic parameter of the subset of intrinsic parameters to generate the intrinsic parameter matrix; and
determining the camera focal length based on the intrinsic parameter matrix.

8. A non-transitory computer-readable medium storing computer-executable instructions for:
determining person keypoints for an environment;
determining person keypoints for an image;
generating a plurality of random camera poses;
for each random camera pose of the plurality of random camera poses:
generating projected person keypoints for the image based on the person keypoints for the environment and the random camera pose;
determining an error value for the random camera pose based on a comparison of the projected person keypoints for the image and corresponding person keypoints for the image; and
assigning a weight to the random camera pose based on the error value.

9. The non-transitory computer-readable medium of claim 8, further comprising computer executable instructions for:
for each random camera pose of the plurality of random camera poses:
comparing the weight assigned to the random camera pose to a threshold; and
determining whether to retain the random camera pose based on the comparison of the weight assigned to the random camera pose to the threshold.

10. The non-transitory computer-readable medium of claim 8, wherein each random camera pose of the plurality of random camera poses is associated with a respective image of a sequences of images.

11. The non-transitory computer-readable medium of claim 8, wherein the computer-executable instructions for determining the person keypoints for the environment and determining the person keypoints for the image comprise computer-executable instructions for training a neural network to determine the person keypoints for the environment and the person keypoints for the image.

12. The non-transitory computer-readable medium of claim 11, wherein the computer-executable instructions for training the neural network to determine the person keypoints for the image comprise computer-executable instructions for training the neural network to identify and assign one or more pixels of the image to a class associated with a person keypoint.

13. The non-transitory computer-readable medium of claim 8, wherein the random camera pose comprises at least one of a random extrinsic camera parameter and a random intrinsic camera parameter.

14. The non-transitory computer-readable medium of claim 8, wherein determining the error value comprises determining a distance between a projected person keypoint for the environment and a corresponding person keypoint for the environment.

15. A computer-implemented data-processing method for camera pose estimation, the method comprising:
locating and identifying, by one or more computer processors, keypoints in an image sequence corresponding to keypoints in an environment, wherein each keypoint of the keypoints in the image is a person keypoint or a semantic keypoint;
matching, by one or more computer processors, each keypoint of the keypoints in the image sequence to a respective keypoint of the keypoints in the environment;
generating, by one or more computer processors, a homography for each image in the image sequence based on the matching of the keypoints in the image sequence to the keypoints in the environment; and
determining, by one or more computer processors, a camera parameter based on the homography.

16. The computer-implemented data-processing method of claim 15, further comprising:
decomposing the homography into an extrinsic parameter matrix, wherein determining the camera parameter based on the homography comprises determining a camera pose based on the extrinsic parameter matrix.

17. The computer-implemented data-processing method of claim 15, further comprising:
refining each image in the image sequence by applying outlier rejection and particle filtering to each image in the image sequence to generate refined parameter estimates, wherein determining the camera parameter based on the homography comprises determining the camera pose based on the refined parameter estimates.

18. The computer-implemented data-processing method of claim 15, further comprising:
decomposing the homography into one or more extrinsic parameter matrices, wherein determining the camera parameter based on the homography comprises determining a camera pose based on the one or more extrinsic parameter matrices.

19. The computer-implemented data-processing method of claim 15, wherein the one or more extrinsic parameter matrices comprises one or more rotation matrices and one or more translational matrices.

20. The computer-implemented data-processing method of claim 15, wherein each keypoint of the keypoints in the environment has a known location.

* * * * *